Patented Nov. 23, 1943

2,334,764

UNITED STATES PATENT OFFICE 2,334,764

PROCESS OF TREATING TEXTILES AND COMPOSITION THEREFOR

Clyde O. Henke and William H. Lockwood, Wilmington, Del., assignors to E. I. du Pont de Nemours & Company, Wilmington, Del., a corporation of Delaware No Drawing. Application March 22, 1940, Serial No. 325,478

12 Claims. (Cl. 252—8.7)

This invention relates to the manufacture of novel softening agents and to processes of softening textile materials therewith. More particularly it relates to the manufacture of softening agents from the unhydrolyzed products obtained from the reaction of non-aromatic high molecular weight organic compounds with sulfur dioxide and chlorine to produce sulfonyl chlorides and sulfonates, and to processes for softening textile materials.

This invention has for an object the manufacture of agents suitable for softening textiles, leather goods and related materials. Another object is to manufacture such agents from inexpensive raw materials. A further object is to manufacture such softening agents by a simple and economical process. A further object is to produce softening agents from the unhydrolyzable products resulting from the treatment of non-aromatic high molecular weight organic compounds with sulfur dioxide and chlorine. A still further object is to treat synthetic and cellulosic fibers so that they will be soft to the touch and free from odor. Still other objects will appear hereinafter.

The objects of the invention are accomplished by the preparation and use of a composition comprising a major proportion of a high molecular weight organic compound free from sulfonate groups containing a substantially saturated hydrocarbon radical of at least 16 carbon atoms, especially an aliphatic hydrocarbon radical and a minor proportion of a mixture of water-soluble high molecular weight organic sulfonic acid salts, wherein the sulfonate groups are attached to a substantially saturated hydrocarbon radical, said mixture predominating in secondary sulfonates.

In a more limited sense, the objects of the invention are accomplished by the preparation and use of a composition comprising 50 to 90% of a high molecular weight organic compound free from sulfonate groups containing a substantially saturated hydrocarbon radical of at least 16 carbon atoms, especially an aliphatic hydrocarbon radical, and 10 to 50% of a mixture of water-soluble high molecular weight organic sulfonic acid salts, wherein the sulfonate groups are attached to a substantially saturated hydrocarbon radical, said mixture predominating in secondary sulfonates, and containing minor amounts of chlorine attached to carbon.

Such compositions may conveniently be prepared by treating high molecular weight hydrocarbon compounds in the fluid state with sulfur dioxide and chlorine until from 10 to 50% has been converted into the corresponding sulfonyl chloride derivatives and this mode of preparation constitutes an important aspect of the invention. Such compositions, however, can be prepared by other processes. The mixture thus obtained which comprises a complex mixture of mono- and poly- and chloro-sulfonyl chlorides predominating in secondary sulfonyl chlorides is then treated with an aqueous alkaline liquid to convert the sulfonyl chloride groups to true sulfonates. The mixture of the sulfonates and unreacted material has been found to be an excellent textile softening agent. It is mixed with water to form a paste and may be used as such or may be further stabilized or diluted as desired. For instance, a stabilizing agent and an agent capable of modifying the softening properties of the product may be added, if desired.

In a more preferred form of the invention the mixture obtained from the sulfonyl chloride reaction is treated with a concentrated aqueous solution of an alkali metal hydroxide such as sodium hydroxide to convert the sulfonyl chloride groups to sodium sulfonates. The mixture of the sodium sulfonates, unreacted material and water forms an excellent softening agent. It may be used in the form of a paste or aqueous solution each of which may be stabilized, if desired.

Various types of stabilizers may be resorted to and they may be of organic or inorganic type. Mixtures may be used. Suitable agents include mono- and polyhydric alcohols, complex silicate clays, e. g. bentonite, fuller's earth, etc., urea, irreversible colloids, etc.

Other types of softening agents may be used in conjunction with the novel softening agents hereof. They may be used along with stabilizers and other materials or alone. Thus, softening agents such as the long chain aliphatic alcohol sulfates, alkali metal, amine, and ammonium salts, alkylated aromatic sulfonates, sulfonated oils, long chain quaternary nitrogen compounds, etc., are useful.

It has been found that when filaments, fibers, threads, skeins, hanks, yarns, fabrics, etc., either synthetic or cellulosic, are treated with aqueous solutions containing small amounts of the above-mentioned compositions, they are softened to a marked degree. The fibers become soft, supple, pliable, and smooth. They are also fuller and in general more pleasing to the touch. The amount of agent used may be varied widely, depending upon the nature of the particular textile material treated and the agent used. From .01 to 5.0% by weight of the aqueous solution represents a practical range. Excellent results are obtained within the range from 0.1 to 2.0%. The solutions have a good softening action on viscose rayon, cellulose acetate, and similar artificial fibers, fabrics, etc., and on natural fibers, e. g. silk, cotton and the like.

The invention will be further illustrated, but is not intended to be limited by the following examples.

Example I

Into a reaction vessel are put 300 parts by weight of a Texas petroleum oil having a Saybolt viscosity at 100° F. of 96 seconds, a specific gravity at 15.5° C. of 0.8727, a refractive index at 20° C. of 1.475, and distilling above 335° C. at atmospheric pressure. A gaseous mixture of sulfur dioxide and chlorine is passed into the oil while maintaining the temperature below 50° C. The reaction is illuminated by the light from a 60 watt incandescent electric light bulb. The reaction mass gains 110 parts by weight during two hours' treatment with the gases. A total of 432 parts of sulfur dioxide and 149 parts of chlorine are passed into the oil during this time. The reacted mass consists largely of hydrocarbon sulfonyl chlorides, including mono-, poly- and chlor-sulfonyl chlorides, predominating in secondary sulfonyl chlorides and unreacted hydrocarbons with some admixture of chlor hydrocarbon sulfonyl chlorides and chlor hydrocarbons, and is poured into 271 parts of hot 30% sodium hydroxide. The temperature of the reaction mass is maintained at 90–95° C. by cooling. The sulfonyl chlorides are thus converted to the sodium salts of the corresponding sulfonic acids. The resulting product is a thick brown paste which is of value as a softening agent. When a sample is diluted with water a clear translucent emulsion is formed which is stable even on long standing.

Example II

Three hundred parts by weight of a refined paraffin wax melting at 122–124° F. and containing hydrocarbons ranging from 20 to 35 carbon atoms in the molecule is put into a reaction vessel and warmed to 55° C. A gaseous mixture of 607 parts by weight of sulfur dioxide and 227 parts by weight of chlorine is passed into the melted wax over a period of three hours. The temperature is maintained at 45–55° C. during the reaction and the reaction mass is irradiated with the light from a 60 watt incandescent tungsten filament electric lamp. The paraffin gains 200 parts by weight. The resulting mixture of paraffin and paraffin sulfonyl chlorides including mono- and polysulfonyl chlorides and chlor-paraffin sulfonyl chlorides predominating in secondary types is poured into 486 parts by weight of hot 30% sodium hydroxide and the temperature held at 90–95° by cooling. The sulfonyl chlorides are hydrolyzed to the corresponding sodium sulfonates in the manner set forth in Example I. A thick paste results which has softening properties on textile materials.

Part of the paste is diluted with an equal weight of water and a little methanol and the resulting solution extracted with three portions of carbon tetrachloride. The extracted solution is distilled to remove any residual solvent and a clear solution results. This solution also possesses softening properties for textile and related materials, but of a somewhat different nature.

Example III

Three hundred parts by weight of a petrolatum having a Saybolt melting point of 120–130° F., an A. S. T. M. consistency of 185–220, a Saybolt viscosity at 210° F. of 45–50 seconds, a flash point of 360–370° F., and a NPA color of white is put in a flask and melted. A gaseous mixture of 172 parts by weight of sulfur dioxide and 136 parts by weight of chlorine is passed into the petrolatum over a period of seventy minutes. The temperature is held at about 50° C. The reaction is illuminated with a 60 watt incandescent lamp. The petrolatum gains 72 parts by weight. The reaction mass which is similar to that prepared according to Examples I and II is poured into 150 parts of 30% sodium hydroxide at about 90–95°. The temperature during the hydrolysis is maintained at 90–95°. The mass becomes quite thick so 100 parts of water is added. A homogeneous paste results which contains 9.4% sulfonated petrolatum and 43.3% unsulfonated petrolatum. The product is of value as a softening agent.

Example IV

Two hundred twenty-five parts of paraffin wax and 75 parts of petrolatum are melted together in a flask at a temperature of approximately 65–70° and treated with a gaseous mixture of 178 parts of sulfur dioxide and 110 parts of chlorine over a period of approximately one hour. During the reaction the flask is illuminated by an incandescent lamp whose radiation is passed through a filter transmitting light between 3400 and 6000 Å. The major proportion falls between 4000 and 5800 Å. The temperature is maintained between 55–65° during the reaction. The mixture of waxes gains 100 pts. The so-formed mixture of hydrocarbons, hydrocarbon sulfonyl chlorides, and the chlorhydrocarbon sulfonyl chlorides is hydrolyzed by pouring into 67 parts of sodium hydroxide dissolved in 124 parts of water. The temperature is maintained at 90–100° during this hydrolysis. A thick paste is formed. To this paste are then added 11 parts of bentonite and 45 parts of water. The mixture is stirred at 90° until it is homogeneous. Five hundred sixty-six parts of product are obtained. The product has good softening properties.

Example V

Fifty parts by weight of match wax having a freezing point of 45° C., a specific gravity of 0.7793 at 50° C. compared to water at 15.5° C. and a refractive index of 1.425 at 80° C. and 50 parts of the petrolatum used in Example III are melted together in a flask. A gaseous mixture of 93 parts by weight of sulfur dioxide and 82 parts by weight of chlorine is passed into the mixture over a period of 50 minutes while the temperature is kept at 50–55° C. The reaction is irradiated by the light from a 60 watt tungsten-filament incandescent lamp. The reacting mass gains 44 parts by weight. The resulting mixture of mono- and poly- and chloro-sulfonyl chlorides predominating in secondary types and unreacted hydrocarbons is hydrolyzed by pouring into 100 parts of 30% sodium hydroxide while keeping the temperature at 90–95° C. The hydrolyzed mass is diluted with 100 parts of water and 11 parts of urea is added to form a homogeneous paste. The product showed softening properties on textiles.

Example VI

Three hundred parts by weight of a paraffin wax with a melting point of 124–126° F. is melted in a flask and a gaseous mixture of 143 parts by weight of sulfur dioxide and 97 parts by weight of chlorine are passed into it over a period of one hour. The temperature is maintained at 60–70° C. The reaction is irradiated with the light from a 150 watt tungsten filament incandescent lamp. The paraffin gains 97 parts in weight. The reaction mass which is similar to that prepared according to Example II is poured into 240 parts of 30% sodium hydroxide, the temperature being held at 90–95° during the hydrolysis. To the thick paste are added 12 parts of bentonite to give added stability to the paste. The product is a valuable softening agent for textile and related materials.

Example VII

Three hundred parts by weight of hydrogenated beef tallow is treated with a gaseous mixture of 324 parts by weight of sulfur dioxide and 326 parts by weight of chlorine over a period of three and one-half hours. The temperature is maintained at 65–70° C. The reaction mass is illuminated with the light from a 60 watt incandescent lamp. The tallow gains 115 parts by weight. The reaction mass which is a complex mixture of mono-, poly- and chloro-sulfonyl chlorides which are attached to the long chain radicals is poured into 325 parts of hot 30% sodium hydroxide. The product is a good softening agent.

Example VIII

Three hundred parts by weight of a purified petroleum fraction having a distillation range of 285° C. to 337° C., a Saybolt universal viscosity at 100° F. of 40 seconds, a specific gravity of 0.8071 at 15.5° C. compared to water at 15.5° C., and a refractive index of 1.4473 at 20° C. is treated with a gaseous mixture of 187 parts by weight of sulfur dioxide and 155 parts by weight of chlorine during a period of 75 minutes. The reaction zone is illuminated by the light from a 60 watt incandescent lamp and the temperature is maintained at approximately 20° C. The reaction mass gains 154 parts in weight. The resulting mixture of hydrocarbon mono-, poly- and chloro-sulfonyl chlorides, hydrocarbons, and a minor proportion of chlorinated derivatives thereof is poured into 498 parts of hot 30% potassium hydroxide solution. There results a thick paste.

Example IX

Paraffin wax of a melting point of 124–126° F. is treated with sulfur dioxide and chlorine in a molar ratio of 1.4 to 1 until 50% of the paraffin is reacted. The resulting mixture which is similar to that prepared in accordance with Example I is hydrolyzed in hot 30% sodium hydroxide solution. Sufficient bentonite to make 2% of the total weight is added while stirring and then about 5% by weight of sodium stearyl sulfate is added. The mixture is stirred to a smooth homogeneous paste.

Example X

Viscose yarn is treated at 50–80° C. in aqueous solution containing 0.2% by weight of the product prepared according to Example I by immersion for a period of about 4 minutes. The yarn after drying is found to be very soft to the touch, smooth and greatly improved in appearance.

Example XI

Crepe fabrics which are made with a cellulose acetate fiber warp and a viscose fiber filling are treated at 40–75° C. for about 15 minutes in an aqueous solution containing about 0.1% of the product prepared in accordance with Example II. The fabric after drying is greatly improved in appearance and soft to the touch.

Example XII

Cellulose acetate yarn is treated at 40–60° C. for 5 minutes in an aqueous bath containing 0.1% by weight of the product prepared in accordance with Example III. After drying the yarn is found to be very soft, free from assuming static charges when handled, of good odor, and free from discoloration.

Example XIII

Cotton sheeting is treated at 60–80° C. for five minutes in an aqueous solution containing 1.0% by weight of the product prepared in accordance with Example V. It is found to be improved in appearance and properties and soft to the touch. The white fabric is free from discoloration.

Example XIV

Cellulose acetate staple fibers are treated at 40–60° C. in an aqueous solution containing 0.05% by weight of the product prepared in accordance with Example VI for about 4 minutes. After drying the cellulose acetate staple fibers are found to be greatly improved in appearance and properties and free from developing static charges when passed through the usual operations involved in the preparation of yarn, e. g. lapping, carding, combing and spinning. The fibers were soft and smooth to the touch and free from odor.

Example XV

Cotton sheeting fabric which has been dyed with "Pontamine" Fast Yellow 4 G. L. (C. I. 349) is treated with an aqueous solution containing 1.0% by weight of the product prepared in accordance with Example IX at a temperature of 50–80° C. for 5 minutes. The sheeting is found to be improved in appearance, soft and smooth to the touch. Its light fastness and shade is found to be unchanged.

In place of the specific condensation products of the preceding examples, any of the herein disclosed softening agents or compositions may be used. The time and temperature of the softening treatment may vary considerably depending upon the particular textile material treated and the softening agent. Thus, an instant up to 10 to 15 minutes represents a practical period. The temperature may be between 30° C. and lower and about 100° C., the preferred range being 60 to 95° C.

The basic hydrocarbon compound starting materials may be varied widely subject to the limitation that they are substantially saturated and should contain at least about 16 carbon atoms or predominate in compounds containing at least 16 carbon atoms. They should be substantially free from olefinic and acetylenic linkages. In general, materials which are essentially saturated are preferred. As examples, mention is made of paraffin base petroleum hydrocarbon fractions including higher boiling gas oil fractions (e. g. having a boiling range substantially above 335° C.), wax distillates, petroleum hydrocarbon waxes including hard and soft and microcrystalline paraffin waxes, match wax, scale wax, petrolatum wax, petrolatum, particularly the lighter colored and white petrolatums, beef tallow, hydrogenated beef tallow, vegetable oils, e. g. coconut oil, palm kernel oil, hydrogenated lard, hydrogenated lard oil, hydrogenated olive oil, myrtle wax, Japan wax, carnauba wax, higher fatty alcohols, e. g. cetyl alcohol, octadecyl alcohol, ceryl alcohol, melessyl alcohol, hydrogenated alcohols obtained from the reduction of sperm and other fish oils, higher boiling naphthenic oils, the higher fractions of hydrocarbons obtained by the hydrogenation of coal or of petroleum, the higher fractions obtained by the hydrogenation of carbon oxides, high molecular weight fatty acids, such as stearic, palmitic, cerotic and erucic acids, high molecular weight ketones such as palmitone, stearone, methyl cetyl ketone, etc., and other such compounds or mixtures. The long chain hydrocarbon radicals as previously stated become substituted with mono-, poly- and chlorosulfonyl chloride groups and minor amounts of chlorine.

The conditions of the reaction may be varied within limits from those set forth in the examples. We prefer to use a mixture of sulfur dioxide and chlorine in which the sulfur dioxide is in a molar excess. Ratios of 1.1 to 1 to 2 to 1 are preferred although ratios of 6 to 1 and upward as high as 20 to 1 may be utilized. Mixtures of the gases in which chlorine is in a molar excess are, in general, avoided since they tend to increase the chlorination of the product.

The temperature of the reaction may be varied over a fairly wide range although it is preferably sufficiently high that the reaction mass will remain fluid. Temperatures in excess of 100° C. are generally avoided as there is a tendency toward discoloration at the higher temperatures. In general a temperature about 5° to 15° above the melting point of the starting material is satisfactory.

Light is desirable to accelerate the reaction. It has been found that ordinary incandescent electric lamps are satisfactory for laboratory and small scale plant work. It has been further found that vapor lamps such as mercury vapor lamps emitting a major proportion of the radiation in the visible range are also satisfactory and are to be preferred in larger scale production. Experiments have shown that a large variety of light waves will accelerate the reaction and consequently different light sources such as rare gas lamps, metallic vapor lamps, ultraviolet lamps, fluorescent vapor lamps, carbon arcs, salt-cored arc lamps, filament lamps, filament lamps used on an over voltage load, or direct sunlight may be used.

While the examples have disclosed the use of concentrated strong caustic alkalies for the hydrolysis of the sulfonyl chlorides, stronger or weaker solutions of organic and inorganic bases may be used. In general, the hydrolysis requires a longer time when dilute alkaline acting agents are used. Thus, instead of the sodium and potassium hydroxides illustrated there may be used other alkali metal hydroxides or carbonates, or ammonium hydroxide, or amines such as methylamine, diethylamine, triethylamine, alkylolamines, e. g. mono-, di- and tri-methylolamines, etc., cyclic-amines such as cyclohexylamine or diethyl-cyclohexylamine, heterocyclic amines, e. g., pyridine, piperidine, ethylpiperidine, etc., or the alkaline earth oxides, hydroxides, or carbonates. The hydrolysis may also be carried out in an acid reacting medium such as an aqueous solution of a mineral acid, e. g., hydrochloric, sulfuric acid, etc.

The final product may be modified in various ways. It may be used as obtained as a soft pasty mass or it may have various agents added to it to alter its viscosity so as to make it thicker or more fluid. Such agents may also have an advantageous effect on the stability of the bath from which the softening agent is applied. Representative of such agents, there may be mentioned urea, octyl alcohol, ethylene glycol, glue, starch, casein, bentonite, fuller's earth, petrolatum, terpineol, cyclohexanol, methyl cyclohexanol, diethylene glycol, propylene glycol, the mixture of alcohols derived by reducing coconut oil and fractionating to obtain a fraction containing ten to eighteen carbon atoms in the chain, salts of naphthalene sulfonate-formaldehyde condensation products, salts or amine salts of higher alkyl sulfuric esters containing 12 to 18 carbon atoms such as the diethyl-cyclohexylamine salt of coconut oil alcohol sulfuric acid esters, ethanolamine salts of fatty acids, salts of sulfonated alkyl aryl compounds such as isopropylated naphthalene sulfonic acid and dodecyl benzene sulfonic acid, sulfated or phosphated ethers or esters of long chain compounds, condensation products of alkylene oxides such as ethylene oxide with alcohols, esters, amines, etc., mahogany and green petroleum sulfonates, gelatin, agar, saponin, quaternary ammonium compounds such as trimethyl octadecyl ammonium bromide, betaine, synthetic long chain betaines such as N-cetyl-α-betaine, N-octadecyl-α-betaine, C-hexadecyl-α-betaine, the sulfonates of alkylated long chain acid amides, etc.

Agents which modify the softening effect of the agents of this invention may also be added to the paste obtained according to the process shown. There may be added, for example, sulfonated tallow and various sulfonated oils such as olive oil and fish oil, petrolatum, long chain aliphatic alcohols, sodium alkyl sulfates such as sodium octadecyl sulfate or sodium cetyl sulfate, long chain quaternary ammonium compounds, long chain C- and N-betaines, substituted amides, petrolatum, etc. Particularly advantageous is the addition of the sodium alkyl sulfates such as sodium octadecyl sulfate.

The method of producing softening agents by this invention is advantageous in that it permits the utilization of inexpensive materials for the manufacture thereof, provides a simple method of manufacture since it is not necessary to purify the product by washing, extracting, separating, etc. as is done generally in the manufacture of softening agents, permits ready modification of the softening action through change of the starting hydrocarbon or long chain compound or the addition of various agents in the final step of manufacture, and furnishes an easily handled and readily dispersible paste for making up the solutions to be used for softening.

This invention possesses the additional advantage that textile and related materials, leather, etc., which are treated with the novel agents or compositions hereof are more acceptable to the trade. They are softer than untreated fibers, for example, smooth to the touch, supple, pliable and fuller. When bleached or white fabrics are treated, no discoloration obtains. On ageing no discoloration or rancidity develops on the fibers or fabrics. When fabrics treated with these materials are exposed to heat as on a calender roll, there is no discoloration or scorching. The shade and light fastness of the dyed materials appears to be unchanged. Furthermore the treatment reduces static charges and the resulting products are free from odor. The advantages are noticeable with natural and synthetic materials including viscose process rayon, cellulose acetate rayon, "Vinyon," casein condensation fibers, regenerated wood fibers, cotton, silk, wool, leather, synthetic leather imitations, flax, linen, felt, jute, hemp, cuprammonium process rayon, nylon, including material made from the fiber forming linear polyamides, such as those of U. S. Patents 2,071,250, 2,071,251, 2,071,253, 2,130,523, and 2,130,948.

As many apparently widely different embodiments of this invention may be made without departing from the spirit and scope thereof, it is to be understood that we do not limit ourselves to the specific embodiments herein except as defined by the appended claims.

We claim:

1. A textile treating composition comprising from 50 to 90% of a substantially saturated aliphatic hydrocarbon having at least 16 carbon atoms and 10 to 50% of a mixture of water soluble substantially saturated aliphatic hydrocarbon sulfonic acid salts containing at least 16 carbon atoms, said mixture predominating in secondary sulfonates.

2. A textile treating composition comprising from 50 to 90% of a substantially saturated aliphatic hydrocarbon having at least 16 carbon atoms and 10 to 50% of a mixture of water soluble substantially saturated aliphatic hydrocarbon sulfonic acid salts containing at least 16 carbon atoms, said mixture predominating in secondary sulfonates, and containing minor amounts of chlorine attached to carbon.

3. A textile treating composition comprising from 50 to 90% of a substantially saturated aliphatic hydrocarbon having at least 16 carbon atoms and 10 to 50% of a mixture of alkali metal substantially saturated aliphatic hydrocarbon sulfonic acid salts containing at least 16 carbon atoms, said mixture predominating in secondary sulfonates, and containing minor amounts of chlorine attached to carbon.

4. A textile treating composition comprising from 50 to 90% of a substantially saturated hydrocarbon having at least 16 carbon atoms and from 10 to 50% of a mixture of water-soluble sulfonic acid salts obtained by reacting a substantially saturated hydrocarbon of at least 16 carbon atoms with admixed sulfur dioxide and chlorine and hydrolyzing the resulting mixture with an alkaline liquid.

5. An aqueous textile softening and finishing solution containing from 0.01 to 5.0% by weight of a composition comprising from 50 to 90% of a substantially saturated aliphatic hydrocarbon having at least 16 carbon atoms and 10 to 50% of a mixture of water soluble substantially saturated aliphatic hydrocarbon sulfonic acid salts containing at least 16 carbon atoms, said mixture predominating in secondary sulfonates.

6. An aqueous textile softening and finishing solution containing from 0.001 to 5% by weight of a composition comprising from 50 to 90% of a substantially saturated aliphatic hydrocarbon having at least 16 carbon atoms and 10 to 50% of a mixture of water-soluble substantially saturated aliphatic hydrocarbon sulfonic acid salts containing at least 16 carbon atoms, said mixture predominating in secondary sulfonates, and containing minor amounts of chlorine attached to carbon.

7. The process which comprises treating a textile material in a solution of the type set forth in claim 5.

8. The process which comprises treating a textile material in a solution of the type set forth in claim 6.

9. A textile treating composition comprising water, a stabilizer and a mixture consisting of a major proportion of a paraffin wax and a minor proportion of a mixture of paraffin wax sulfonic acid water soluble salts predominating in secondary sulfonates and containing small amounts of combined chlorine.

10. A textile treating composition comprising water, and a mixture consisting of a major proportion of a paraffin wax and a minor proportion of a mixture of paraffin wax sulfonic acid water soluble salts predominating in secondary sulfonates and containing small amounts of combined chlorine, and bentonite.

11. A textile treating composition comprising water and a mixture consisting of a major proportion of a paraffin wax and petrolatum, and a minor proportion of a mixture of paraffin wax and petrolatum sulfonic acid water soluble salts predominating in secondary sulfonates and containing small amounts of combined chlorine, and bentonite.

12. A textile treating composition comprising from 50 to 90% of a substantially saturated hydrocarbon having at least 16 carbon atoms and from 10 to 50% of a mixture of alkali metal sulfonic acid salts obtainable by reacting a substantially saturated hydrocarbon of at least 16 carbon atoms with admixed sulfur dioxide and chlorine while irradiated with actinic light until from 10 to 50% has been converted into the corresponding sulfonyl chloride derivatives, and hydrolyzing the resulting mixture with an alkali metal hydroxide solution.

CLYDE O. HENKE.
WILLIAM H. LOCKWOOD.